(12) United States Patent
Pan (10) Patent No.: US 10,462,490 B2
(45) Date of Patent: Oct. 29, 2019

(54) EFFICIENT VIDEO DATA REPRESENTATION AND CONTENT BASED VIDEO RETRIEVAL FRAMEWORK

(71) Applicant: RAYTHEON COMPANY, Waltham, MA (US)

(72) Inventor: Jingning Pan, Tuson, AZ (US)

(73) Assignee: Raytheon Company, Waltham, MA (US)

( * ) Notice: Subject to any disclaimer, the term of this patent is extended or adjusted under 35 U.S.C. 154(b) by 801 days.

(21) Appl. No.: 14/934,618

(22) Filed: Nov. 6, 2015

(65) Prior Publication Data

US 2017/0134754 A1   May 11, 2017

(51) Int. Cl.
| | | |
|---|---|---|
| H04N 19/17 | (2014.01) | |
| H04N 19/20 | (2014.01) | |
| G06F 16/71 | (2019.01) | |
| G06K 9/78 | (2006.01) | |
| H04N 19/63 | (2014.01) | |
| H04N 19/179 | (2014.01) | |
| H04N 19/23 | (2014.01) | |
| G06F 16/783 | (2019.01) | |

(52) U.S. Cl.
CPC ......... *H04N 19/63* (2014.11); *G06F 16/7837* (2019.01); *H04N 19/179* (2014.11); *H04N 19/23* (2014.11)

(58) Field of Classification Search
CPC ...... H04N 19/63; H04N 19/23; H04N 19/179; G06F 17/30781
See application file for complete search history.

(56) References Cited

U.S. PATENT DOCUMENTS

| | | | | |
|---|---|---|---|---|
| 5,412,741 A | * | 5/1995 | Shapiro | H03M 7/30 382/232 |
| 5,563,960 A | * | 10/1996 | Shapiro | H04N 1/40093 375/240.11 |
| 5,740,277 A | * | 4/1998 | Katto | H04N 19/63 375/E7.047 |
| 5,778,098 A | * | 7/1998 | Lee | H04N 19/56 348/415.1 |
| 5,784,175 A | * | 7/1998 | Lee | G06F 17/153 348/154 |
| 5,787,203 A | * | 7/1998 | Lee | H04N 19/23 375/E7.086 |
| 5,920,477 A | * | 7/1999 | Hoffberg | G06F 3/0482 382/181 |

(Continued)

OTHER PUBLICATIONS

Mrinal Kumar Mandal, "Wavelet Based Coding and Indexing of Images and Video", University of Ottawa, Oct. 1998 (Year: 1998).*

(Continued)

*Primary Examiner* — Sathyanaraya V Perungvoor
*Assistant Examiner* — Philip P. Dang
(74) *Attorney, Agent, or Firm* — Burns & Levinson LLP; Joseph M. Maraia (57) ABSTRACT

An efficient object-detection-driven video data representation along with a unified content based video compression and retrieval framework and wavelet based searching engine is described to encode the disclosed video data representation. The video data representation and unified compression and retrieval and searching engine together facilitate rapid retrieval of desired video information from large stores of video data.

24 Claims, 7 Drawing Sheets

(56) References Cited

U.S. PATENT DOCUMENTS

| | | | | |
|---|---|---|---|---|
| 5,946,419 A * | 8/1999 | Chen | ............... | G06T 17/00 375/E7.03 |
| 5,982,438 A * | 11/1999 | Lin | ............... | H04N 19/63 375/240.12 |
| 6,037,988 A * | 3/2000 | Gu | ............... | H04N 19/56 375/240.16 |
| 6,075,875 A * | 6/2000 | Gu | ............... | G06T 9/001 375/E7.04 |
| 6,160,846 A * | 12/2000 | Chiang | ............... | H04N 19/517 375/240.05 |
| 6,222,941 B1 * | 4/2001 | Zandi | ............... | G06F 17/148 375/E7.016 |
| 6,236,758 B1 * | 5/2001 | Sodagar | ............... | H04N 19/647 375/240.19 |
| 6,483,946 B1 * | 11/2002 | Martucci | ............... | H04N 19/647 382/240 |
| 7,136,710 B1 * | 11/2006 | Hoffberg | ............... | G06F 3/0482 700/83 |
| 7,418,142 B2 * | 8/2008 | Zandi | ............... | G06F 17/148 375/E7.016 |
| 7,581,027 B2 * | 8/2009 | Boliek | ............... | H04N 21/23432 709/201 |
| 8,432,451 B2 * | 4/2013 | Cetin | ............... | G06K 9/6288 348/164 |
| 8,600,830 B2 * | 12/2013 | Hoffberg | ............... | G06Q 30/0207 705/26.3 |
| 8,625,678 B2 * | 1/2014 | Cordara | ............... | H04N 19/537 375/240.26 |
| 8,874,477 B2 * | 10/2014 | Hoffberg | ............... | G06Q 10/0631 705/37 |
| 2003/0133500 A1 * | 7/2003 | Auwera | ............... | H04N 19/63 375/240.11 |
| 2003/0198395 A1 * | 10/2003 | Lynch | ............... | G06T 9/002 382/240 |
| 2004/0213349 A1 * | 10/2004 | Zador | ............... | G06T 9/008 375/240.22 |
| 2007/0223582 A1 * | 9/2007 | Borer | ............... | H04N 19/619 375/240.12 |
| 2008/0031344 A1 * | 2/2008 | Lu | ............... | H04N 19/647 375/240.19 |
| 2010/0260268 A1 * | 10/2010 | Cowan | ............... | H04N 19/597 375/240.25 |
| 2012/0082385 A1 * | 4/2012 | Xu | ............... | G06K 9/6857 382/199 |

OTHER PUBLICATIONS

Kim, B-J, "Low Bit-Rate Scalable Video Coding with 3-D Set partitioning in Hierarchical Trees (3-D SPIHT)", IEEE Transactions on Circuits and Systems for Video Technology, vol. 10, No. 8, Dec. 2000 (Year: 2000).*

Adami, N. "State-of-the-Art and Trends in Scalable Video Compression With Wavelet-Based Approaches", IEEE Transactions on Circuits and Systems for Video Technology, vol. 17, No. 9, Sep. 2007 (Year: 2007).*

* cited by examiner

EFFICIENT VIDEO DATA REPRESENTATION AND CONTENT BASED VIDEO RETRIEVAL FRAMEWORK

BACKGROUND

Video data is continuously collected and stored by various imaging systems. These systems include various imaging systems deployed on satellites and unmanned aerial vehicles (UAVs) used in intelligence surveillance reconnaissance (ISR) applications, for example. In order to select desired portions of the data for viewing and/or analysis, the video data may be annotated and/or indexed for retrieval based on certain aspects of the video content.

In the past, video databases have been relatively small, and indexing and retrieval have been based on keywords annotated manually. Due to the increase of video database, content-based indexing and retrieval is required.

Due to the large amount of video data that is being captured and stored by various imaging systems, automatic systems and methods are needed to perform content-based video indexing and retrieval with minimum human intervention. Such systems may request and collect ISR sensor data and may automatically search, retrieve, and/or populate data, for example.

Automatic video indexing and retrieval techniques are generally based on particular representations or formats of the video data. Video information may be represented either as raw data or in compressed data formats, such as MPEG-4. Some of these video formats are not designed for video retrieval. Therefore, the process of retrieving desired portions of the video data is often complicated and slow. Moreover, retrieval results from data that is not indexed generally cannot be re-used.

Efficient techniques for video data storage and retrieval may rely heavily on video structure analysis. However, currently used video formats generally do not prepare video data for video structure analysis.

Certain video retrieval techniques that are presently being developed are limited to rapid retrieval based on the existing video representation, such as MPEG-4 or raw video.

SUMMARY

One aspect of the present disclosure includes a new video data representation, which supports large video compression and also prepares video data for effective video structure analysis and fast video content retrieval. Systems and methods described herein utilize the novel video representation scheme coupled with a content-based video retrieval framework. The disclosed content-based retrieval framework provides a contextual frame of reference that makes the data relevant to a decision maker. This provides faster access to information.

The disclosed systems and methods for effective video data representation provide a high video data compression ratio, along with content indexing and an effective data structure for fast video retrieval.

Embodiments of the present disclosure include methods, systems, and computer-readable medium, with program codes embodied thereon, for processing a sequence of images.

One embodiment is a method, executed by one or more processors, for processing a series of image frames in a video data to compress, store, search and/or retrieve images of interest in the video data. The method includes performing a segmenting process on the video data. The segmenting process distinguishes different portions of the video data representing different objects and background images. A wavelet transform process is then performed on each of the different portions to compress the video data. The wavelet transform process encodes each of the different objects and background images in a respective wavelet pyramid representation. The method also includes identifying one or more features associated with each of the different objects and background images and encoding the features in association with the respective wavelet pyramid representation of their respective different objects and background images to generate a feature indexed wavelet pyramid representation of the video data.

The disclosed video data representation provides an efficient method for shot boundary detection. In video storage processes shot boundary detection is very important step because shots temporally partition video data into a set of structured data and the structured data can be easily retrieved. Each of the shot boundaries separates different shots in the video data and each of the different shots represents a respective sequence of similar frames of the video data.

The shot boundaries can be detected in the video data by identifying abrupt transitions of wavelet coefficients from frame to frame in the feature indexed wavelet pyramid representation of the video data. The wavelet coefficients can be associated with a key object in the respective sequence of similar frames, for example. Alternatively, the shot boundaries can be detected in the video by identifying abrupt transitions of the encoded features from frame to frame in the wavelet pyramid representation of the video data. The features can be associated with a key object in the respective sequence of similar frames, for example.

The method can also include identifying a key frame in each of the different shots that includes one or more key objects and/or key features that are common to the respective sequence of similar frames within the respective shot. Each of the key frames can be encoded as a respective wavelet pyramid in the wavelet pyramid representation. In this embodiment, an association between each of the key frames and their corresponding shots may also be stored and/or encoded.

In an embodiment, the method can also include locating a portion of the video data associated with a selected one or more of the features by searching for the selected one or more of the feature in only the key frames for portions of the video data associated with the feature. One or more of the key frames that are associated with the selected one or more features are identified. The respective shots represented by the identified key frames can then be retrieved.

In another embodiment, the method can also include locating a portion of the video data associated with a selected one or more of the objects by searching the wavelet pyramid representation of only the key frames for video data associated with the selected one or more of the objects. One or more of the key frames that are associated with the selected one or more of the objects are identified. The respective shots represented by the one or more of the key frames can then be retrieved.

BRIEF DESCRIPTION OF THE DRAWINGS

The foregoing will be apparent from the following more particular description of example embodiments of the present disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

The present disclosure includes an efficient object detection driven video data representation. A unified content based video compression and retrieval framework including a Wavelet based search engine is also disclosed to implement the disclosed video data representation. The disclosed video data representation and unified compression and retrieval and searching engine together facilitate rapid retrieval of desired video information from large stores of video data.

The disclosed object detection driven video data representation encodes the video data in a format that emphasizes object detection and de-emphasizes background image information. Background images in video data are typically not important in many data-to-decision (D2D) applications, for example. However, background images usually cover much greater areas on an image plane than do objects of interest such as detected objects, tracks and targets. Therefore, the disclosed object detection driven video data representations, which emphasize object detections and de-emphasize background information, can be used to implement fast and effective D2D applications.

By emphasizing object detections and de-emphasizing background information, the disclosed video data representations enable a very high compression ratio and facilitate fast video retrieval based on target object attributes. A content based compression algorithm based on the disclosed video data representation can compresses video data to a compression ratio of about $10^3:1$ to $10^4:1$, for example.

The disclosed video data representations also facilitate processing of video data queries and retrieval of desired video data based on target object attributes. According to aspects of the present disclosure, content based compression and retrieval are unified so that retrieval processes are greatly simplified and searching speed is greatly improved.

According to an aspect of the present disclosure, the unified content based compression and retrieval system encodes each object found in the video data into a wavelet pyramid structure. The unified content based compression and retrieval system also encodes metadata along with the video data. The metadata describes attributes of the video data or objects and facilitates indexed based searching of the video data.

According to aspects of the present disclosure, a segmentation process identifies objects in each frame of video data. A wavelet pyramid structure is then used to encode the objects. The wavelet pyramid representation of segmented objects facilitates the implementation of an improved object based searching engine. Aspects of the present disclosure include implementation of a wavelet based search engine that is much faster than previously known search engines that employ vector matching algorithms, for example. Object detection related video retrieval, searching, and browsing based on the disclosed video data representation is easier, faster and more accurate than the previously known video retrieval systems.

Figure 1:
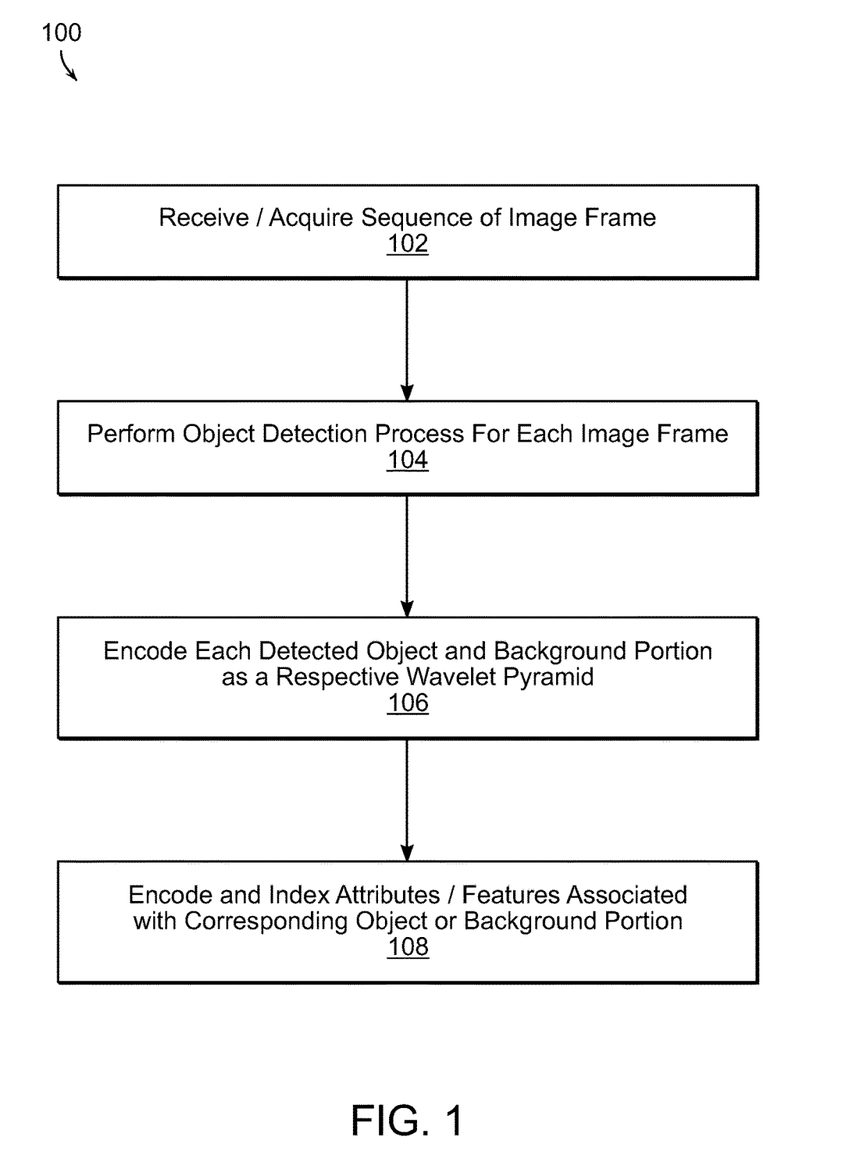
FIG. 1 is a process flow diagram describing a method for representing video data using wavelet pyramid representations of segmented objects along with metadata, according to aspects of the present disclosure.

A method for generating an object detection-based video representation based on a wavelet pyramid data structure according to an aspect of the present disclosure is described with reference to FIG. 1. The method 100 includes receiving a sequence of image frames in block 102. In block 104, object detection is performed in each image frame. Object detection may be performed by segmentation process and/or by one or more of various other previously known object detection techniques for example. In block 106, each object or background is encoded in a wavelet pyramid. In block 108, attributes and other features of each object and/or background, such as object detection ID, scheme, value, tracking ID and tracking information, are indexed and encoded and associated with the corresponding object's or background's wavelet pyramid.

When video is encoded according to the disclosed content-based compression techniques, the objects on each frame are classified and segmented by one or more object detection algorithms. Suitable object detection algorithms are known, which segment objects in image frames based on motion, color, texture, spatial frequency, gradient, for example. Objects that are detected by the object detection algorithm are considered to be foreground objects. Portions of the image that are not in a detected object are considered to be background portions of the image. Foreground objects are generally given higher priority than the background portions of the image and are encoded using more encoding bits than the background portions.

Wavelet algorithms are well known multi-resolution spatial compression techniques, which decomposes an image into a sub-band pyramid structure. Wavelet compression algorithms decompose each object into a pyramid of multiple sub-bands. The top-level sub-bands of an object at the top of each wavelet pyramid have much smaller dimensions than lower level sub-bands of the same wavelet pyramid. The top-level wavelet coefficient contains more energy than bottom-level wavelet coefficients.

According to aspects of the present disclosure, a wavelet algorithm is used to compress foreground objects and background portions of image data in each frame. Each detected object and background portion are encoded as a wavelet pyramid. Some sub-bands of the background portions of an image have low priority, thus a low bit rate can be used to encode the low priority sub-bands representing the background portions. Foreground objects are compressed with higher bit rates than the background portions of image frames. Thus, the disclosed wavelet decomposition of objects in the video data allows good image approximation using only a few coefficients.

According to an aspect of the present disclosure, conventional temporal compression algorithms such as motion compensation can also be applied in addition to the disclosed wavelet spatial compression for each foreground object and background portion. Performing temporal compression along with wavelet spatial compression can significantly reduce video data redundancy. For example, temporal compression allows significant compression of video data in applications where background images in portions of the video data do not change significantly from frame to frame. Temporal compression techniques may also be beneficial for video storage and retrieval because they generate a motion vector for each object. The motion vector is a feature of each object that can be stored and used in video retrieval, for example.

According to an aspect of the present disclosure, additional information that is descriptive of each compressed object and/or background portion is encoded and stored as metadata in association with the spatially compressed and/or temporally compressed representation of the corresponding object or background portion. The additional information may include features of an object or other attributes of the compressed video data associated with the object such as an object detection identifier, object detection method, detection value, track ID, motion information, and track confidence.

Figure 2:
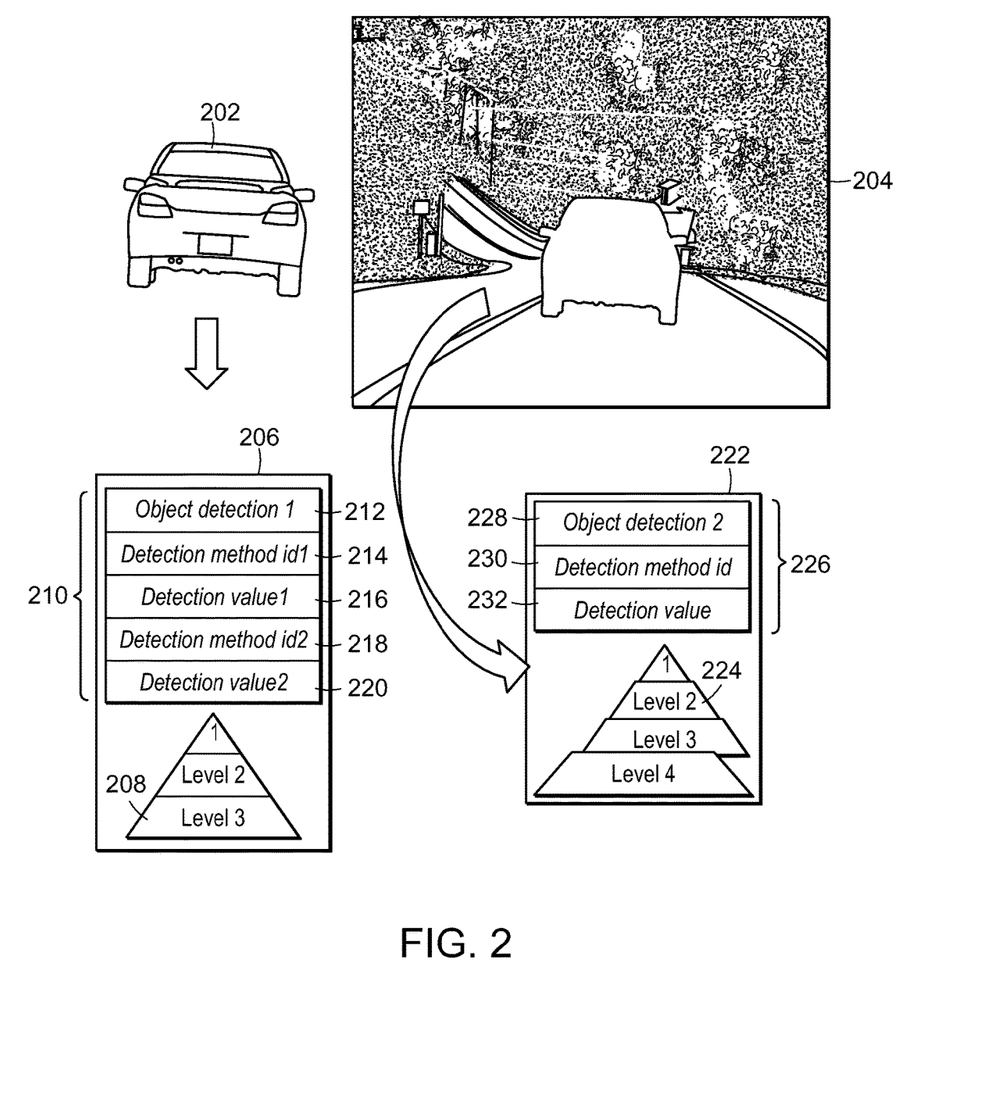
FIG. 2 illustrates examples of video data representations for an object and background portions of a video image frame according to an aspect of the present disclosure.

FIG. 2, shows examples of video data representations for an object and background portions of a video image frame according to an aspect of the present disclosure. In this example, image data in a frame has been segmented into an object 202, and background portions 204. A first video data representation 206 includes a first wavelet pyramid 208 comprising a compressed representation of the object 202 video data from the frame. In this example, the first wavelet pyramid 208 includes three sub-bands. The first video data representation 206 also includes encoded metadata 210 associated with the object in the first wavelet pyramid 208.

In the first video data representation 206 of the frame, the encoded metadata 210 includes an object identifier 212 of the object 202, a first detection method identifier 214 of the object 202, a first detection value 216 of the object 202 in the first detection method, a second detection method identifier 218 of the object 202, and a second detection value 220 of the object 202 in the second detection method.

A second video data representation 222 includes a second wavelet pyramid 224 comprising a compressed representation of the background portion 204 of video data from the frame. In this example, the second wavelet pyramid 224 includes four bands. The second video data representation 222 also includes encoded metadata 226 associated with the background portion 204 in the second wavelet pyramid 224.

In the second video data representation 222 of the frame, the encoded metadata 226 includes an object identifier of the background portion 228, a detection method identifier 230 of the background portion 214 and a detection value 232 of the background portion 204 in the first detection method.

The detection method identifiers and detection method values are descriptive of the object detection or segmentation algorithms used to detect the corresponding object or background portion in a video frame. Often, more than one detection method is used to detect potential target objects in a sequence of image frames. According to an aspect of the present disclosure, the corresponding detection method and feature value can be encoded and associated with the encoding of a potential target object. For example, if a corner is detected by a Harris operation as the detection method, a metadata tag representing the use of the Harris operation and the response value calculated by the Harris operation are encoded with video in association with the detected corner.

According to an aspect of the present disclosure, the tags and feature values can be used in video retrieval and video content querying, for example. Furthermore, other features, such as associated track ID, lifetime, and/or target confidence level, for example, can also be encoded and associated with the encoding of each corresponding object to facilitate faster video content query and decision making.

Figure 3:
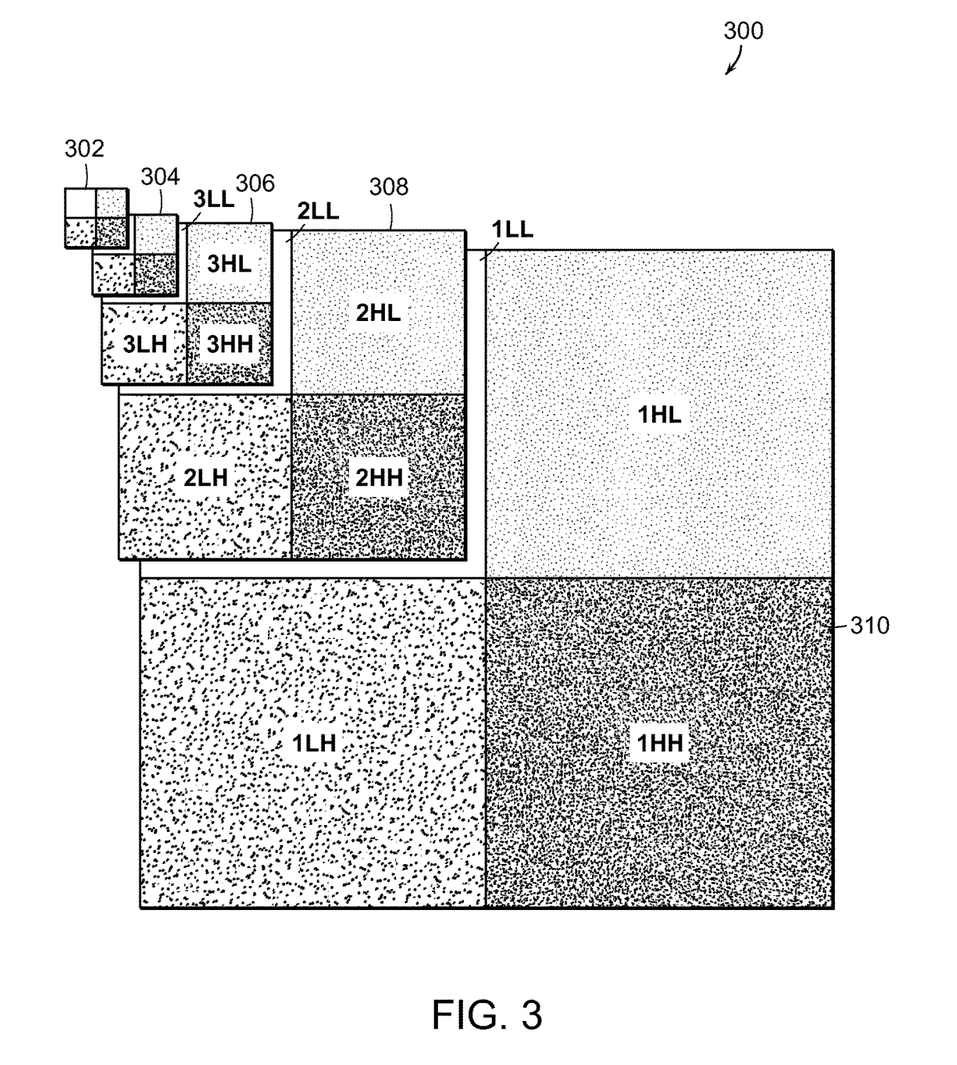
FIG. 3 illustrates a wavelet pyramid representation of a detected object in an image frame.

Another aspect of the present disclosure includes a search and retrieve framework based on the wavelet pyramid structure of detected objects in the disclosed video data representation. Referring to FIG. 3, a wavelet decomposes an object into multiple sub-bands in a pyramid form 300. In the pyramid form 300, a top sub-band of an object 302 is used first to search and match similar objects in a large video database. A second from the top sub-band 304 is then used for searching and matching within the results of the top sub-band search. Then progressively lower sub-bands 306, 308, 310 are sequentially used for searching and matching within the results of the searching previous band until a satisfactory result is obtained.

The disclosed object detection based video data representation supports text based query-by-index data search and retrieval techniques as well as image content based query-by-object image chip data search and retrieval techniques. The disclosed retrieval methods facilitate fast retrieval of video clips, key frames, specific target objects, and object features, from large amounts of video data, for example. The use of a wavelet pyramid structure to encode detected objects and background portions facilitates the use of very fast hierarchical and progressive similarity matching algorithms for searching and retrieving video data. The disclosed method of performing hierarchical and progressive similarity matching algorithms to search the disclosed wavelet pyramid representation of detected objects and background portions of video data is much faster than the existing video search and retrieval techniques, which use feature vector matching algorithms, for example.

According to an aspect of the present disclosure, a query by index search can be performed to browse the video data by simply searching the index of features and attributes that is encoded along with their associated objects and/or background portions during the image data compression and storage process in which the object detection based video data representation is constructed. The features and/or attributes of each object, which are encoded automatically as metadata in the disclosed video data representation, can be used to rapidly search for and retrieve particular video frames, images of particular objects and/or features of objects in a large video database, using a query by index search for example.

According to another aspect of the present disclosure the object detection based video data representation facilitates a query by object image chip search of video data. The query by object image chip search is an efficient data retrieval method that allows an end user or automatic decision making algorithm to search for particular objects or background portions of the video data by providing an example. The object detection based video data representation also facilitates automated searching using very fast and progressive image based searching algorithms for example. This allows a user or automatic target identification algorithm to rapidly search for and/or retrieve all objects that have similar image in a large database of video data.

According to an aspect of the present disclosure video structure analysis algorithms are used to structure a video into shots and to identify a key frame within each shot. The disclosed shot boundary detection and key frame selection schemes significantly reduce computation time of video structure analysis during video storage and retrieval processes.

In the context of video data processing, shots are contiguous portions of video data that include similar frames. Shots have been used as basic building blocks to support many high-level video access operations. Since the frames within a shot are similar, one of the frames is chosen as the key frame to represent the shot. The attributes (image indices) of the key frame are obtained from the image content in the frame, such as texture, shape, motion, and others. The attributes provide a succinct representation of the visual content within a shot. The process of temporal partitioning of video into shots has been termed as shot boundary detection.

Figure 4:
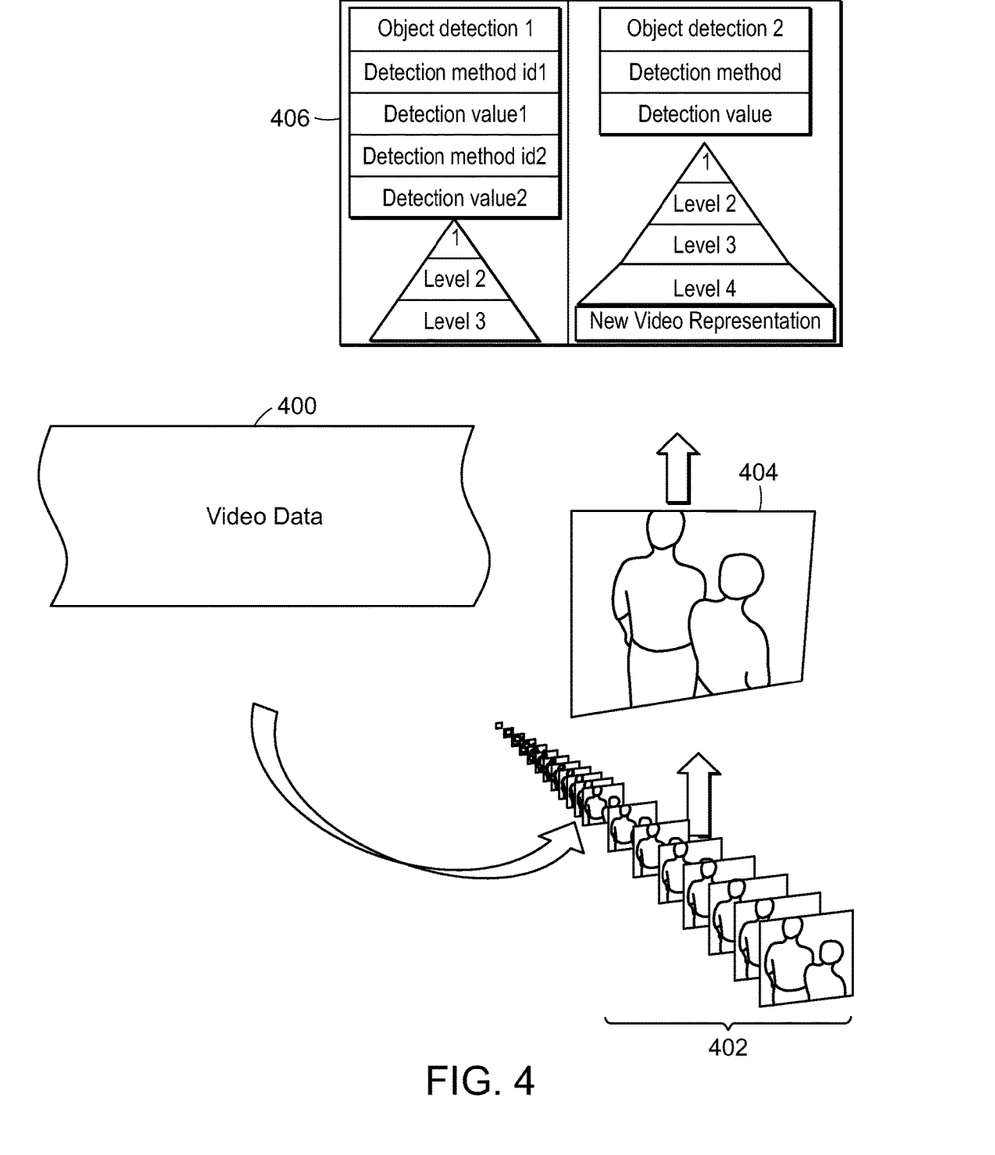
FIG. 4 illustrates decomposition of a video database into shots according to an aspect of the present disclosure.

Referring to FIG. 4, a video database 400 may be decomposed into shots 402 in a shot boundary detection process. Aspects of the present disclosure include a method of shot boundary detection based on abrupt transitions of object feature values or wavelet coefficients between frames of video data. For example, a shot boundary may be identified between frames where an object and/or background moves more than a predetermined amount causing an abrupt transition in the wavelet pyramid of the object.

According to an aspect of the present disclosure, one of the frames in each shot 402 is chosen as a key frame 404 of the shot. The attributes of the key frame 404 are obtained from the image content in the frame. Because the frames within a shot are similar, the attributes of the key frame of a shot provide a succinct representation of the visual content within the shot.

In one example, for each segmented object and/or background portion in each of the key frames 404, an object identifier, detection method identifier, detection value, tracking ID and/or tracking information is encoded and stored a content based representation 406 in association with the corresponding wavelet pyramid of the respective object and/or background portion. Because wavelet coefficients of each object image are encoded along with encoded features and attributes of the object in the disclosed video format, the attributes of a key frame can be obtained from objects key in the frame such as potential target objects and other highly interested objects. In one example, shot boundary detection can be performed based on abrupt changes of feature values and/or changes of the wavelet coefficients of the key objects.

After shot boundary detection is performed and key frames of each shot are selected, a text based video retrieval can be performed by searching only the key frames in the video database. Also, an image content based video retrieval can be performed by searching the wavelet pyramids associated with the key frames. Thus, the retrieval speed will be further improved.

Figure 5:
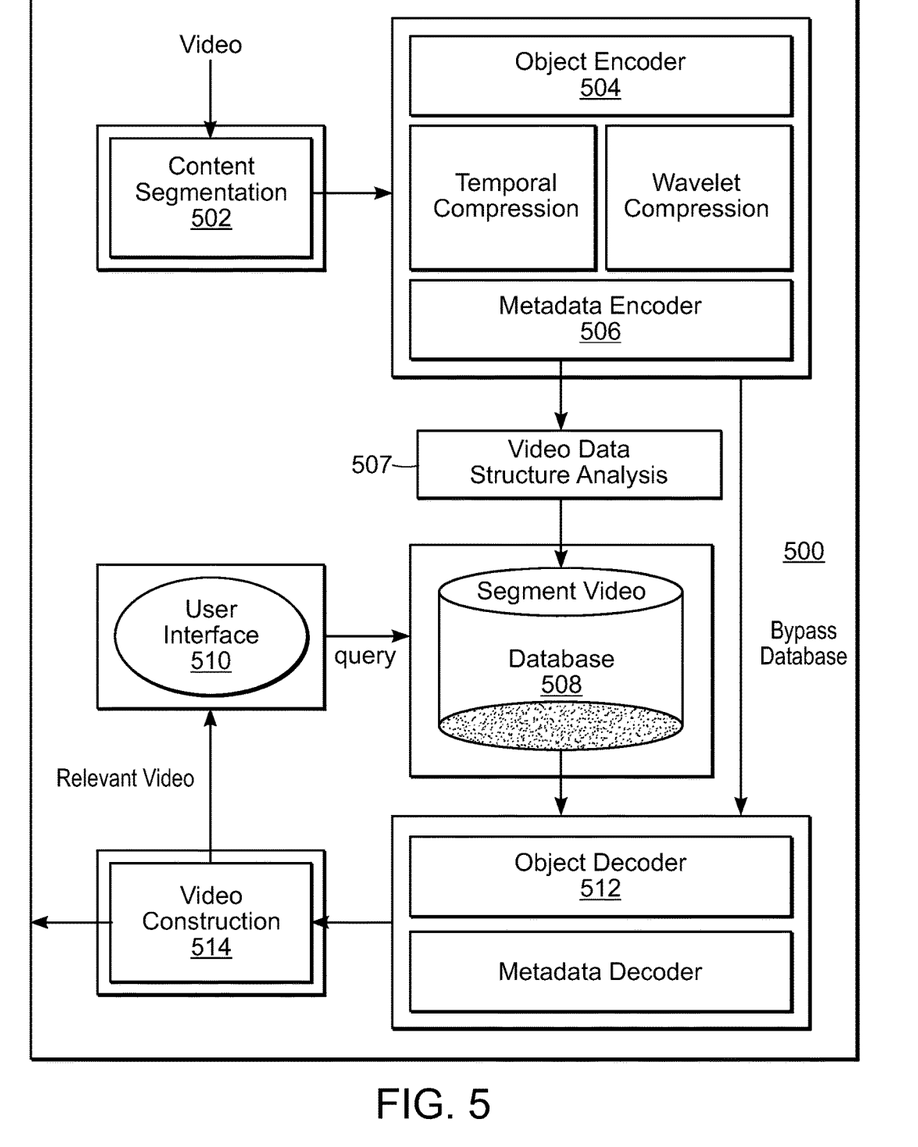
FIG. 5 is a system block diagram illustrating a comprehensive framework including a content based video data compression systems and rapid video search and retrieval system according to an aspect of the present disclosure.

Referring to FIG. 5, the present disclosure provides a comprehensive framework 500 in which the disclosed content based video data compression systems and methods enable the disclosed rapid video search and retrieval systems and methods. The framework 500 includes a content segmentation module 502 which receives video data from a video data source such as a sensor, for example. The content segmentation module 502 performs object detection by segmenting the video data into one or more objects and/or background portions. An object encoder module 504 receives the segmented objects and or background portions from the content segmentation module 502 and encodes them into respective wavelet pyramid structures. The object encoder module 504 may also perform temporal compression of the objects and background portions. A metadata encoder module 506 encodes features and/or attributes that are descriptive of the objects and/or background portions, and stores the encoded features and/or attributes as metadata associated with the wavelet pyramids of the corresponding objects and/or background portions. The wavelet pyramids and metadata are stored in a segment video database 508. In a video data structure analysis module, 507, shot boundary detection may be performed on the encoded wavelet pyramids and/or metadata to divide the video data into shots for storage in the database 508. Key frame identification may be performed to identify a key frame representative of each shot.

The framework 500 also includes a user interface 510 that receives requests to search or retrieve particular video data from a user. The requests may include query by object instructions and/or query by index instructions, for example. The user interface initiates a search of the segment video database 500 in response to the query. The search can be performed by searching for the requested video data or feature in only the key frames stored in the segment video database 508. For each key frame matching a query that is found in the segment video database 508, the wavelet pyramid and metadata for the entire shot represented by the key frame is decoded by an object decoder module 512. The object decoder module 512 expands the segment video data by transforming the wavelet pyramids of each frame in the retrieved shots into a decompressed format readable by the user interface. The object decoder module 512 may also decode the metadata for presenting to a user via the user interface 510 or for informing the object decoding process of object values, for example. A video construction module 514 arranges the decompressed shots into a coherent sequence of shots for presenting to the user as video on the user interface 510 or for transmission to a subsequent process, for example.

The disclosed video representation and content based compression and retrieval framework provide an efficient solution for video data management. Using the disclosed framework, a fast and effective video data retrieval system can be implemented to manage databases that store very large volumes of data. Although the framework is described herein based on video data, it should be understood by persons skilled in the art that systems for storing and retrieving other types of data, such as synthetic aperture radar imagery, audio, text from large data stores can also be implemented using the disclosed video representation and content based compression and retrieval framework.

Moreover, persons skilled in the art should understand that the disclosed video representation and content based compression and retrieval framework can be expended to support multimodal, structured, and unstructured data. Also systems for encoding data in the disclosed object based video representation can be embedded in remote system, such as Unmanned Aerial Vehicles, or processed before storing video in a database, for example. The disclosed framework supports both automatic video data retrieval and human-machine interactive querying. Thus, the framework can be directly used in automatic D2D system as an interactive tool to help an analyst to make decisions more quickly.

Figure 6:
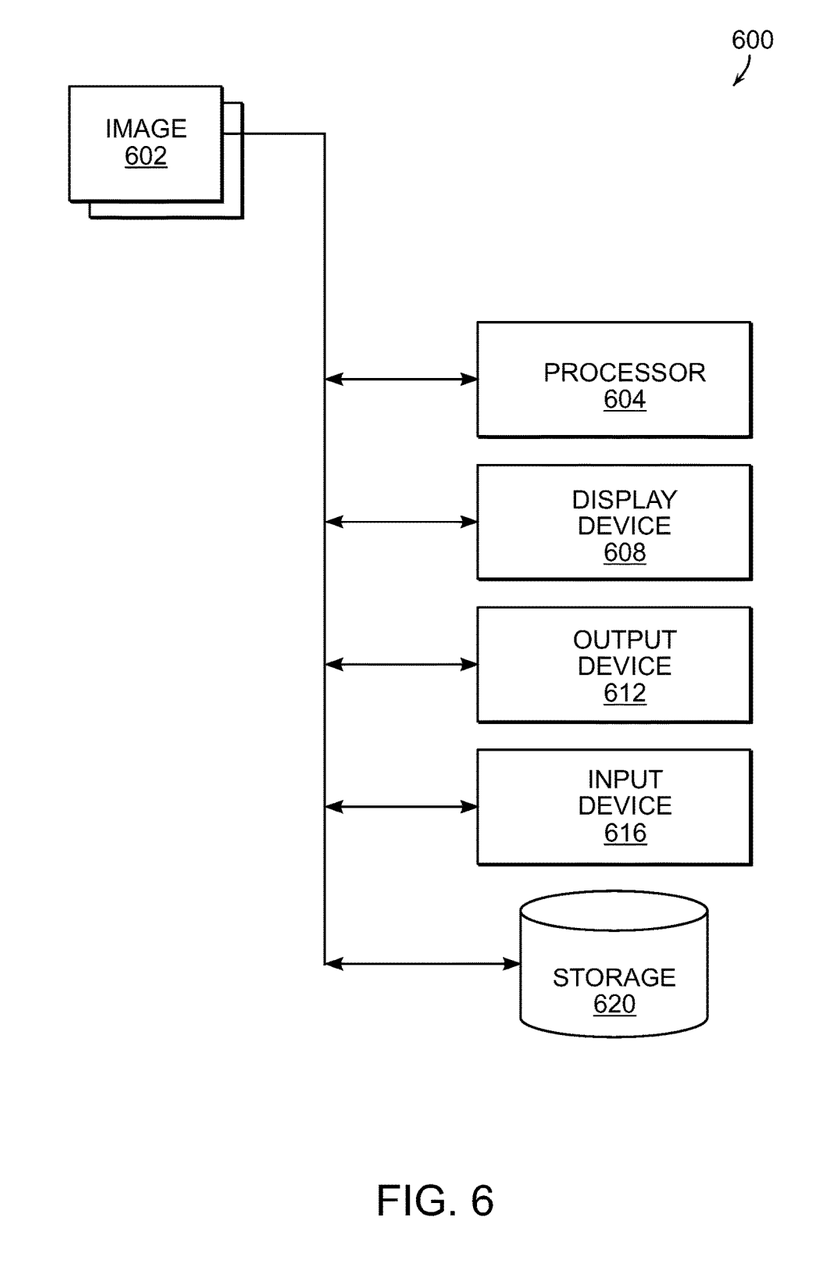
FIG. 6 is a schematic illustration of a system for detecting objects in an image, in accordance with an example embodiment of the present disclosure.

FIG. 6 is a schematic illustration of a system 600 for processing video data 602, according to an embodiment of the present disclosure. The system 600 includes a processor 604 for processing the video data 602. The processor 604 stores a variety of information about the video data 602 and the system 600. The storage device 620 can include a plurality of storage devices. The storage device 620 can include, for example, long-term storage (e.g., a hard drive, a tape storage device, flash memory), short-term storage (e.g., a random access memory, a graphics memory), and/or any other type of computer readable storage.

The modules and devices described herein can, for example, utilize the processor 604 to execute computer executable instructions and/or include a processor to execute computer executable instructions (e.g., an encryption processing unit, a field programmable gate array processing unit). It should be understood that the system 600 can include, for example, other modules, devices, and/or processors known in the art and/or varieties of the illustrated modules, devices, and/or processors.

The input device 616 receives information associated with the system 600 (e.g., instructions from a user, instructions from another computing device) from a user (not shown) and/or another computing system (not shown). The input device 616 can include, for example, a keyboard, scanner or mouse. The output device 612 outputs information associated with the system 600 (e.g., information to a printer (not shown), information to an audio speaker (not shown)).

The optional display device 608 displays information associated with the system 600 (e.g., status information, configuration information). The processor 604 executes the operating system and/or any other computer executable instructions for the system 600 (e.g., processes the image 602 to detect objects in the video data 602).

Figure 7:
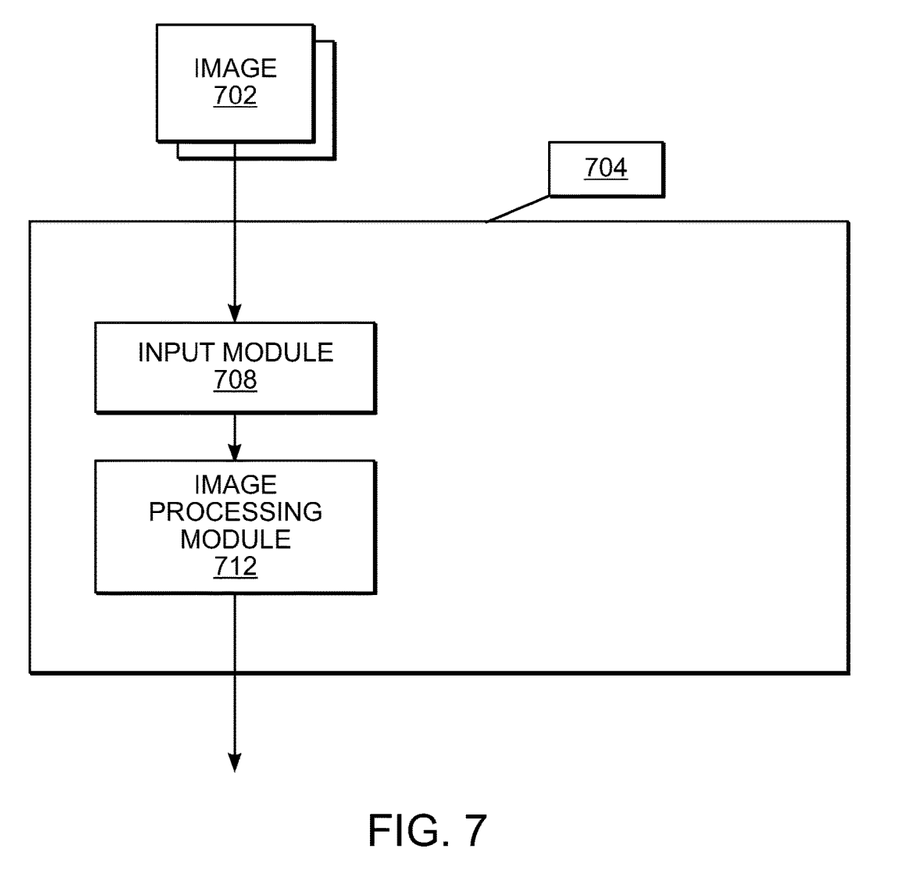
FIG. 7 is a schematic illustration of exemplary modules implemented in a processor in accordance with an example embodiment of the present disclosure.

FIG. 7 is a schematic illustration of exemplary modules implemented in a processor 704, according to an embodiment. In one embodiment, the processor 704 is used as the processor 604 of FIG. 6 to implement the methods of FIG. 1, 2 or 3. The processor 704 includes an input module 708 and an image processing module 712. The input module 708 receives magnitude and orientation values for each pixel in an image 702 and provides the values to the image processing module 712. The image processing module 712 performs, for example, steps of FIG. 1, 2 or 3.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be an FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include (and can be operatively coupled to receive data from and/or transfer data to) one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry® device or Apple® iPad device.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The teachings of all patents, published applications and references cited herein are incorporated by reference in their entirety.

While the present disclosure has been particularly shown and described with references to example embodiments thereof, it will be understood by those skilled in the art that various changes in form and details may be made therein without departing from the scope of the present disclosure encompassed by the appended claims.

What is claimed is:

1. A method, executed by one or more processors, for processing a series of image frames in a video data to compress, store, search and/or retrieve images of interest in the video data, the method comprising:
   performing a segmenting process on the video data, wherein the segmenting process distinguishes different portions of the video data representing different objects and background images;
   performing a wavelet transform process on each of the different portions to compress the video data, wherein the wavelet transform process encodes each of the different objects and background images in a respective wavelet pyramid representation;
   identifying one or more features associated with each of the different objects and background images; and
   encoding the one or more features in association with the respective encoded wavelet pyramid representation of their respective different objects and background images to generate a feature indexed wavelet pyramid representation of the video data, wherein the feature indexed wavelet period representation comprises the respective wavelet pyramid representations and a separate encoded index of attributes associated with the objects encoded in the respective wavelet pyramid representation, wherein the attributes are in the group consisting of object detection ID, scheme, value, tracking ID and tracking information of the objects.

2. The method of claim 1, further comprising:
   detecting one or more shot boundaries using the feature indexed wavelet pyramid representation of the video data without decoding the feature indexed wavelet pyramid representation of the video data, wherein each of the shot boundaries separates different shots in the video data, and wherein each of the different shots represents a respective sequence of similar frames of the video data.

3. The method of claim 2, comprising: partitioning the video data into one or more sets of the different shots.

4. The method of claim 3, comprising: detecting the one or more shot boundaries in the video data by identifying abrupt transitions of wavelet coefficients from frame to frame in the feature indexed wavelet pyramid representation of the video data.

5. The method of claim 4, wherein the wavelet coefficients are associated with a key object in the respective sequence of similar frames.

6. The method of claim 3 comprising: detecting the one or more shot boundaries in the video data by identifying abrupt transitions of the one or more features from frame to frame in the wavelet pyramid representation of the video data.

7. The method of claim 6, wherein the one or more features are associated with a key object in the respective sequence of similar frames.

8. The method of claim 6, further comprising:
   identifying a key frame in each of the different shots that includes one or more key objects and/or key features that are common to the respective sequence of similar frames within the respective shot; and
   identifying an association between each of the key frames and their corresponding shots.

9. The method of claim 8, further comprising: storing the partitioned video data based on the association.

10. The method of claim 9, further comprising:
    locating a portion of the video data associated with a selected one or more of the features by searching for the selected one or more of the feature in only the key frames for portions of the video data associated with the feature without decoding the feature indexed wavelet pyramid representation of the video data;
    identifying one or more of the key frames that are associated with the selected one or more features; and
    retrieving a respective shot represented by the one or more of the key frames that are associated with the one or more features.

11. The method of claim 9, further comprising:
    locating a portion of the video data associated with a selected one or more of the objects by searching the wavelet pyramid representation of only the key frames for video data associated with the selected one or more of the objects;
    identifying one or more of the key frames that are associated with the selected one or more of the objects; and
    retrieving a respective shot represented by the one or more of the key frames that are associated with the one or more of the objects.

12. A system for processing a sequence of images to compress, store, search and/or retrieve images of interest in the video data, the system comprising:

one or more processors in communication with a data storage device, the one or more processors configured to:

perform a segmenting process on the video data, wherein the segmenting process distinguishes different portions of the video data representing different objects and background images;

perform a wavelet transform process on each of the different portions to compress the video data, wherein the wavelet transform process encodes each of the different objects and background images in a respective wavelet pyramid representation;

identify one or more features associated with each of the different objects and background images; and encode and index the one or more features in association with the respective wavelet pyramid representation of their respective different objects and background images to generate a feature indexed wavelet pyramid representation of the video data, wherein the feature indexed wavelet period representation comprises the respective wavelet pyramid representations and a separate encoded index of attributes associated with the objects encoded in the respective wavelet pyramid representation, wherein the attributes are in the group consisting of object detection ID, scheme, value, tracking ID and tracking information of the objects.

13. The system of claim 12 wherein the one or more processors are further configured to detect one or more shot boundaries in the feature indexed wavelet pyramid representation of the video data, wherein each of the shot boundaries separates different shots in the video data, and wherein each of the different shots represents a respective sequence of similar frames of the video data.

14. The system of claim 13 wherein the one or more processors are further configured to detect the one or more shot boundaries in the video data by identifying abrupt transitions of wavelet coefficients from frame to frame in the feature indexed wavelet pyramid representation of the video data, wherein the wavelet coefficients are associated with a key object in the respective sequence of similar frames.

15. The system of claim 13 wherein the one or more processors are further configured to detect the one or more shot boundaries in the video data by identifying abrupt transitions of the one or more features from frame to frame in the wavelet pyramid representation of the video data, wherein the one or more features are associated with a key object in the respective sequence of similar frames.

16. The system of claim 13 wherein the one or more processors are further configured to identify a key frame in each of the different shots that includes one or more key objects and/or key features that are common to the respective sequence of similar frames within the respective shot;

identifying an association between each of the key frames and their corresponding shots.

17. The system of claim 16 wherein the one or more processors are further configured to store the video data based on the association.

18. The system of claim 17 wherein the one or more processors are further configured to locate a portion of the video data associated with a selected one or more of the objects by searching the wavelet pyramid representation of only the key frames for video data associated with the selected one or more of the objects;

identify one or more of the key frames that are associated with the selected one or more of the objects; and retrieve a respective shot represented by the one or more of the key frames that are associated with the one or more of the objects.

19. A non-transitory computer-readable medium having computer readable program codes embodied thereon for processing a sequence of images to compress, store, search and/or retrieve images of interest in the video data, the computer-readable codes including instructions that, when executed by a processor, cause the processor to:

perform a segmenting process on the video data, wherein the segmenting process distinguishes different portions of the video data representing different objects and background images;

perform a wavelet transform process on each of the different portions to compress the video data, wherein the wavelet transform process encodes each of the different objects and background images in a respective wavelet pyramid representation;

identify one or more features associated with each of the different objects and background images; and encode the one or more features in association with the respective encoded wavelet pyramid representation of their respective different objects and background images to generate a feature indexed wavelet pyramid representation of the video data, wherein the feature indexed wavelet period representation comprises the respective wavelet pyramid representations and a separate encoded index of attributes associated with the objects encoded in the respective wavelet pyramid representation, wherein the attributes are in the group consisting of object detection ID, scheme, value, tracking ID and tracking information of the objects.

20. The non-transitory computer-readable medium of claim 19 further including computer-readable codes including instructions that, when executed by a processor, cause the processor to:

encode each object of each frame in the motion compensation method.

21. The non-transitory computer-readable medium of claim 20 further including computer-readable codes including instructions that, when executed by a processor, cause the processor to:

detect the one or more shot boundaries in the video data by identifying abrupt transitions of wavelet coefficients from frame to frame in the feature indexed wavelet pyramid representation of the video data, wherein the wavelet coefficients are associated with a key object in the respective sequence of similar frames; and identify a plurality of partitions of the video data separated by the shot boundaries.

22. The non-transitory computer-readable medium of claim 21 further including computer-readable codes including instructions that, when executed by a processor, cause the processor to:

identify a key frame in each of the different shots that includes one or more key objects and/or key features that are common to the respective sequence of similar frames within the respective shot;

indexing an association between each of the key frames and their corresponding shots; and storing the video data based on the indexing.

23. The non-transitory computer-readable medium of claim 22 further including computer-readable codes including instructions that, when executed by a processor, cause the processor to:

locate a portion of the video data associated with a selected one or more of the objects by searching the wavelet pyramid representation of only the key frames for video data associated with the selected one or more of the objects without decoding the feature indexed wavelet pyramid representation of the video data;

identify one or more of the key frames that are associated with the selected one or more of the objects; and retrieve a respective shot represented by the one or more of the key frames that are associated with the one or more of the objects.

24. The non-transitory computer-readable medium of claim 22 further including computer-readable codes including instructions that, when executed by a processor, cause the processor to:

locate a portion of the video data associated with a selected one or more of the features by searching for the selected one or more of the feature in only the key frames for portions of the video data associated with the feature without decoding feature indexed wavelet pyramid representation of the video data;

identify one or more of the key frames that are associated with the selected one or more features; and retrieve a respective shot represented by the one or more of the key frames that are associated with the one or more features.

* * * * *